Patented Dec. 1, 1953

2,661,360

UNITED STATES PATENT OFFICE 2,661,360

METHOD OF MAKING MERCURIC ACETATE

Frank P. Greenspan, Buffalo, N. Y., assignor to Buffalo Electro-Chemical Company, Inc., Tonawanda, N. Y.

No Drawing. Application January 30, 1952,
Serial No. 269,133

6 Claims. (Cl. 260—431)

This invention pertains to a method of making mercuric acetate and more particularly to a method of making it from metallic mercury.

Mercuric acetate is not only a useful compound by itself, but is of considerable importance in the manufacture of organic mercury compounds such as the pharmaceutically valuable phenyl mercury compounds.

Mercuric acetate has heretofore been made by various methods, all involving the use of a mercury compound as the starting material. In one widely used method, mercuric oxide is reacted with glacial acetic acid. In another method, mercuric chloride is digested with sodium hydroxide in a sodium chloride solution, the resulting mercuric oxide then being reacted with glacial acetic acid. These as well as other methods, based on the use of a mercury compound as starting material, are relatively costly and uneconomical. This is due to the fact that metallic mercury is sold at substantially lower prices than its compounds, such as the oxide, nitrate, chloride, etc.

The relative insolubility of metallic mercury in acetic acid has prevented the use of the cheaper metallic mercury in the manufacture of mercuric acetate and although direct preparation of the acetate from metallic mercury had been recognized as the more desirable method, actual practice has continued to make use of the relatively expensive mercury compounds.

I have now found that mercuric acetate may be made in a highly efficient manner by treating metallic mercury with peracetic acid in acetic acid medium. While metallic mercury is practically insoluble in acetic acid, it will dissolve in accordance with the present invention in peracetic acid with the intermediate formation of mercurous acetate, which is subsequently transformed into mercuric acetate by heating in presence of peracetic acid.

The following examples will serve to illustrate the principle of my invention.

Example I

A peracetic acid solution was prepared by reacting 90% hydrogen peroxide with glacial acetic acid, the two reactants being used in a mole ratio of 1:1.5 in the manner described by Greenspan in J. Am. Chem. Soc. 68, 907, using nitric acid as catalyst instead of the sulfuric acid catalyst described in that paper. The nitric acid was employed in an amount corresponding to 1% of total volume of reactants. The resulting peracetic acid 40% solution was then used in the preparation of mercuric acetate as follows.

In an all-glass apparatus consisting of a two-neck flask equipped with reflux condenser, to prevent evaporation losses, and stirrer were placed 24 g. of metallic mercury to which were added 48 ml. of glacial acetic acid. The mercury was slurried up in the acid by means of the stirrer and then there was added in one batch 18.8 g. of the above described peracetic acid solution, this amount corresponding to a 10% excess, calculated on a total active oxygen basis, over the stoichiometric amount required. Agitation of the reaction mixture was continued for approximately 12 hours at room temperature, after which time a copious amount of insoluble mercurous acetate had formed.

The flask with its contents was then heated on a waterbath until the precipitated, insoluble mercurous acetate was dissolved by transformation into soluble mercuric acetate. There was no trace of metallic mercury or other insoluble residue. The solution was then cooled to precipitate the mercuric acetate, which was recovered by filtering off the liquid phase.

The product analyzed 61.7% Hg. It was readily soluble in water. Total weight of mercuric acetate recovered was 37.8 g., indicating a practically theoretical yield.

Example II

In another test preparation of mercuric acetate was carried out exactly as described in Example I, but very vigorous stirring was provided for by using a high efficiency stirrer. Agitation of the reaction mixture was continued for 2 hours at room temperature. The flask with its contents was then brought to reflux temperature. After 15 minutes of refluxing, the precipitated, insoluble mercurous acetate had been completely dissolved by transformation into the soluble mercuric acetate. There was no trace of metallic mercury or other insoluble residue. The solution was then cooled to precipitate the mercuric acetate, which was recovered by filtering off the liquid phase.

The product obtained analyzed 61.4% Hg. It was readily soluble in water. Total weight of mercuric acetate recovered was 37.6 g., indicating a practically theoretical yield.

Although intensive stirring will permit a substantial reduction in reaction time, as shown by Examples 1 and 2, a similar increase in rate of reaction may be obtained by working at temperatures above room temperature, preferably again with intensive stirring as employed in Example 2. These variations in procedure are pointed out here as obvious possibilities of influencing the progress of the reaction, without being claimed to be critical, as my invention is based on the discovery that metallic mercury will dissolve in peracetic acid.

From a commercial viewpoint the above procedure will be preferred although the reaction will take place in aqueous solution but with a sacrifice in time. Furthermore, the procedure may be varied by first forming mercurous acetate from metallic mercury and substantially the stoichiometric amount of peracetic acid. The white crystals of mercurous acetate may be changed to soluble mercuric acetate by heating in an acid medium in presence of an oxidizing agent, as which peracetic acid may serve. A slow transformation only will take place at room temperature.

To insure high yields of uncontaminated mercuric acetate, the reaction system employed should be free of components apt to form mercury compounds other than the desired acetate. More particularly, formation of mercury compounds insoluble in the reaction medium should be avoided.

The 40% peracetic acid solution of commerce is ordinarily prepared by reacting highly concentrated hydrogen peroxide with glacial acetic acid in presence of minor amounts of sulfuric acid, which serves to catalyze the reaction. A description of this method of manufacture has been given by Greenspan in J. Am. Chem. Soc. 68, 907. Although the amount of sulfuric acid present in the end product is small, peracetic acid solutions prepared by this method will contain approximately 1% by volume of sulfuric acid. If such peracetic acid solutions are used in my method of making mercuric acetate, the sulfuric acid present would give rise to the formation of a small but corresponding amount of undesirable, insoluble mercuric sulfate which can be filtered off if desired.

For this reason, the sulfuric acid, commonly used as the catalyst in the preparation of peracetic acid solutions, is preferably replaced by an acidic catalyst not giving rise to the formation of undesirable, insoluble by-products when making mercuric acetate in accordance with the process of my invention. Of the various acidic catalysts usable in preparing peracetic acid solutions, nitric acid, hydrogen fluoride, boron fluoride, fluoboric acid, ethane sulfonic acid, p-toluene sulfonic acid and camphor sulfonic acid among others will not cause formation of undesirable, insoluble by-products and are suitable for use in my process of making mercuric acetate. Although all these acidic catalysts will serve equally well for the preparation of peracetic acid solutions and for their subsequent use in making the mercuric acetate, I prefer to use nitric acid for reasons of cost and ready availability. However, where by-product formation is not objectionable, sulfuric acid or any other catalyst suitable for use in preparing peracetic acid may be used.

The process of my invention permits the manufacture of mercuric acetate in practically theoretical yields by means of a reaction between metallic mercury and peracetic acid at a cost of approximately ⅔ of the cost of manufacturing mercuric acetate by any of the methods known to the art involving the use of a mercury compound.

What I claim is:

1. The method of making mercuric acetate which comprises reacting metallic mercury with peracetic acid.

2. The method of making mercuric acetate which comprises reacting metallic mercury with peracetic acid in substantially stoichiometric amounts.

3. The method of making mercuric acetate which comprises reacting metallic mercury in acetic acid with peracetic acid in substantially stoichiometric amounts 4. The method of making mercuric acetate which comprises reacting metallic mercury with an amount of peracetic acid sufficient to transform the mercury to mercurous acetate then reacting the latter with peracetic acid to form mercuric acetate.

5. The method of making mercuric acetate which comprises reacting metallic mercury with peracetic acid in the presence of acetic acid.

6. The method of making mercuric acetate which comprises intimately agitating peracetic acid with metallic mercury in the presence of acetic acid until mercurous acetate is formed then heating the reaction mixture still containing peracetic acid to speed the conversion mercurous acetate to mercuric acetate.

FRANK P. GREENSPAN.

References Cited in the file of this patent

Salkowski: Chemiker-Zeitung, vol. 40, pages 448–449 (1916).